US005497622A

United States Patent [19]

Nam

[11] Patent Number: 5,497,622

[45] Date of Patent: Mar. 12, 1996

[54] TIME DELAY VALVE OF A HYDRAULIC MOTOR

[75] Inventor: Jung-Jin Nam, Kyung Nam, Rep. of Korea

[73] Assignee: Samsung Heavy Industry Co., Ltd., Rep. of Korea

[21] Appl. No.: 340,236

[22] Filed: Nov. 16, 1994

[30] Foreign Application Priority Data

Dec. 30, 1993 [KR] Rep. of Korea .......................... 93-31352

[51] Int. Cl.[6] .............................. F16P 31/02; F15B 15/26

[52] U.S. Cl. ...................................... 60/435; 91/44; 91/45

[58] Field of Search ................................ 92/12.2, 57, 71; 91/41, 44, 45; 60/435, 436, 487; 137/501, 596.1

[56] References Cited

U.S. PATENT DOCUMENTS

| | | | |
|---|---|---|---|
| 4,557,109 | 12/1985 | Nagahara et al. | 60/436 |
| 4,565,117 | 1/1986 | Forster | 92/57 X |
| 4,930,312 | 6/1990 | Metcalf | 60/435 X |
| 5,220,790 | 6/1993 | Allart et al. | 60/435 |
| 5,280,804 | 1/1994 | Takashima et al. | 137/501 |

*Primary Examiner*—F. Daniel Lopez
*Assistant Examiner*—Hoang Nguyen
*Attorney, Agent, or Firm*—Lieberman & Nowak

[57] ABSTRACT

Disclosed is a a time delay valve, which has a reduced number of components so that the manufacture thereof is easy and the number of manufacturing processes is reduced, and by which the delay time thereof is easily reset and changed. The time delay valve is disposed incorporated in a casted-housing of the hydraulic motor to be prevented from being damaged. The time delay valve has a spool movably disposed therein in such a manner to be elastically supported by a spring and be moved by a signal pressure applied to a signal pressure port, and an orifice spool movably disposed therein with being elastically supported by another spring. The constant pressure port and the pressure receiving chamber is interconnected with each other through an oil flowing path in the course of an alternating stroke of the spool. The orifice spool is moved by the elastic force of the spring and the pressure difference between a spring chamber of the orifice spool and an oil flowing path.

3 Claims, 4 Drawing Sheets

TIME DELAY VALVE OF A HYDRAULIC MOTOR

BACKGROUND OF THE INVENTION

1. Field of the Invention

The present invention relates to a time delay valve disposed in a hydraulic motor to delay the brake time until it is completely braked, and more particularly to a time delay valve disposed incorporated in a casted-housing of the hydraulic motor to be prevented from being damaged.

2. Prior Art

When a hydraulic motor having been rotated is braked abruptly, a shock generated by the abrupt stop of the motor is apt to break parts of the hydraulic motor and shortens the life of the hydraulic motor. To avoid such a shock, it is general that a time delay valve is provided at the hydraulic motor to delay the time for braking-the motor.

Especially in a swing motor which is a hydraulic motor of relatively large size used for a construction equipment, there is a possibility of danger that the interior of the swing motor is seriously damaged when a parking brake used for braking the swing motor is operated abruptly, because the inertial force of the swing motor is large. Therefore, it is essential that the swing motor is provided with a time delay valve so that the parking brake is operated after the swing motor is completely stopped.

Referring to FIG. 1 showing a conventional brake system for a hydraulic motor, a brake piston 103 is elastically supported by a spring 105 at one side of the interior of a hydraulic motor housing 101. In the brake system, first disc plate 107 protruding from the inner wall of housing 101 are engaged with/disengaged from second disc plate 111 protruding from the outer wall of a cylinder block 109 according to the movement of brake piston 103 by an oil pressure applied to piston 103, and accordingly the hydraulic motor is braked/released. In the meantime, as shown in detail in FIG. 2, a time delay valve 131, which is separately manufactured, is assembled at one side of hydraulic motor housing 101 by a plurality of bolts 133, a spring washer 135 is disposed between an outer contact surface of time delay valve 131 and the head of each bolt 133 so as to prevent bolt 133 from being released.

Meanwhile, in the conventional time delay valve having the above described construction, bolts 133 are apt to be damaged because it is exposed to impacts which can be generated in the course of the operation of valve. Such a damage has a bad effect on the entire hydraulic motor, and can cause a severe problem on an entire equipment in which the motor is installed.

Further, there are so many restrictions and inconveniences in installing and moving the hydraulic motor because time delay valve 131 protrudes so far from hydraulic motor housing 101. Furthermore, not only the oil flowing path is complicated and thereby the formation of the path is difficult, but also O-rings for preventing the leakage of oil must be disposed at contact portions between the outer wall of hydraulic motor housing 101 and components such as a spool 137 and an orifice spool 139, so that the manufacturing process of the valve is very complicated and accordingly the manufacturing cost thereof is increased.

Besides, because spring 141 elastically supporting orifice spool 139 must be replaced with a new one to reset or change the delay time, and because the time delay valve must be completely separated from the hydraulic motor housing to replace the spring with a new one, resetting or changing the delay time is very complicated and inconvenient.

SUMMARY OF THE INVENTION

The present invention has been made to overcome the above described problems of the conventional time delay valve, and accordingly it is an object of the present invention is to provide a time delay valve, which is formed incorporated in a hydraulic motor housing to be prevented from being damaged, which has a reduced number of components so that the manufacture thereof is easy and the number of manufacturing processes is reduced, and by which the delay time thereof is easily reset and changed.

To achieve the above object, the present time delay valve of a hydraulic motor comprising: a time delay valve body incorporated with a housing of the hydraulic motor at one side of the housing; a constant pressure port and a signal pressure port in the time delay valve body; a spool movably disposed in the time delay valve body in such a manner to be elastically supported by a spring and be moved by a signal pressure applied to the signal pressure port; a first oil flowing path, one end of which is interconnected to a pressure receiving chamber of the brake spring and the other end of which is interconnected to a spool hole of the spool, the constant pressure port and the pressure receiving chamber being interconnected with each other through the first oil flowing path in the course of an alternating stroke of the spool; an orifice spool movably disposed in the first oil flowing path with being elastically supported by a spring, at one end of which an orifice opened toward the first oil flowing path is formed, and at both sides of which through holes are formed, the orifice spool being moved by the elastic force of the spring and the pressure difference between a spring chamber of the orifice spool and the first oil flowing path; and a second oil flowing path, one end of which is interconnected to the spool hole of the orifice spool and the other end of which is interconnected to a pressure exhausting chamber, the one end of the second oil flowing path is interconnected to the through holes of the orifice spool in the course of alternating stroke of the orifice spool.

Preferably, the time delay valve further comprises a member for forwarding and retreating the orifice spool with opposing the elastic force of the spring which supports the orifice spool elastically, and for retaining the orifice spool in a forwarded or retreated position thereof, the member can be a support bolt inserted and engaged in the time delay valve from the exterior thereof, one end of the support bolt inserted in the time delay valve being in contact with at least a part of a surface of the one end surface of the orifice spool.

BRIEF DESCRIPTION OF THE DRAWINGS

The above object, and other features and advantages of the present invention will become apparent by describing the preferred embodiment in detail with reference to the accompanying drawings, in which.

DETAILED DESCRIPTION OF THE PREFERRED EMBODIMENT

Figure 1:
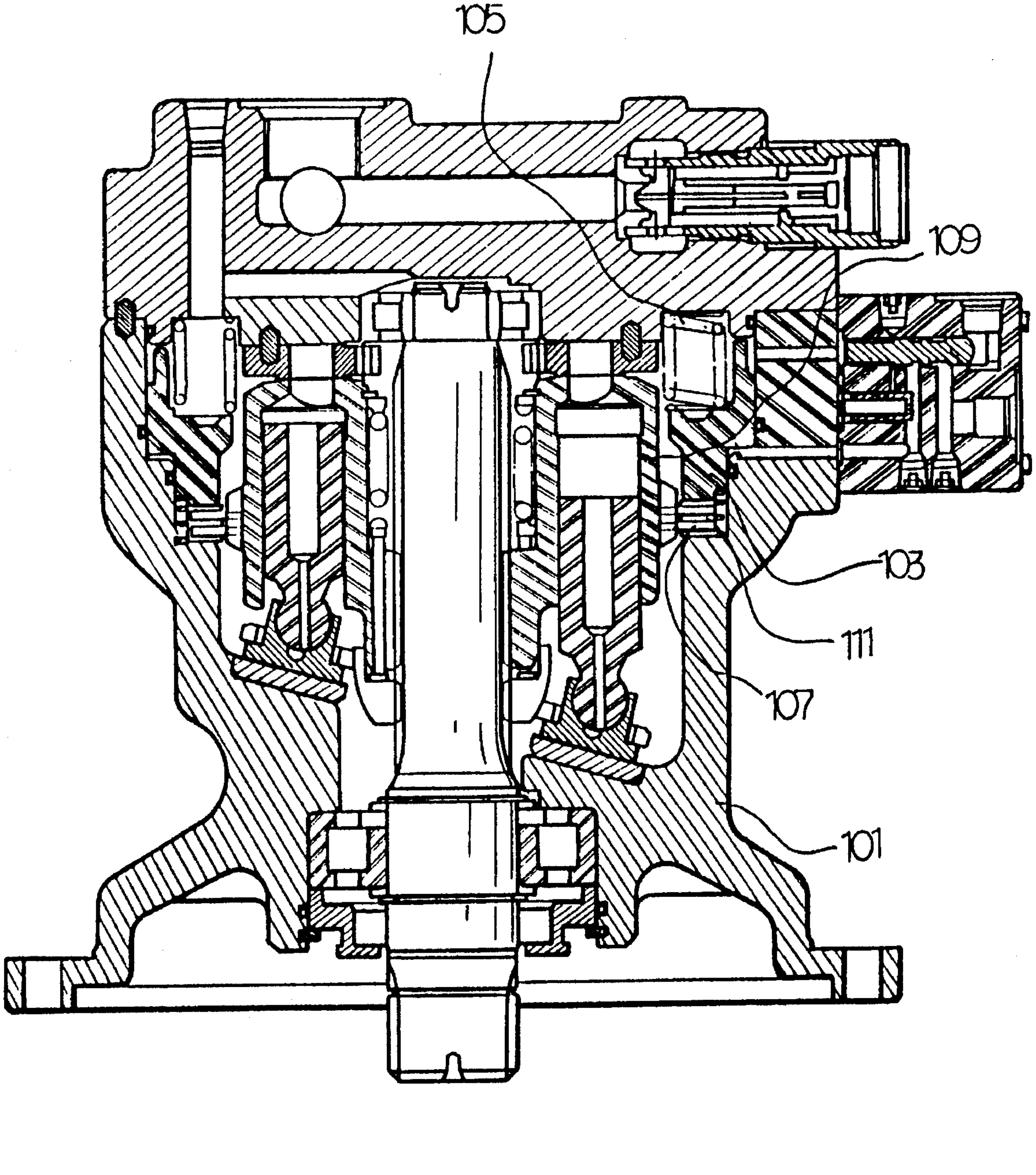
FIG. 1 PRIOR ART
FIG. 1 is a longitudinal section of a conventional hydraulic motor having a time delay valve installed therein.
Figure 2:
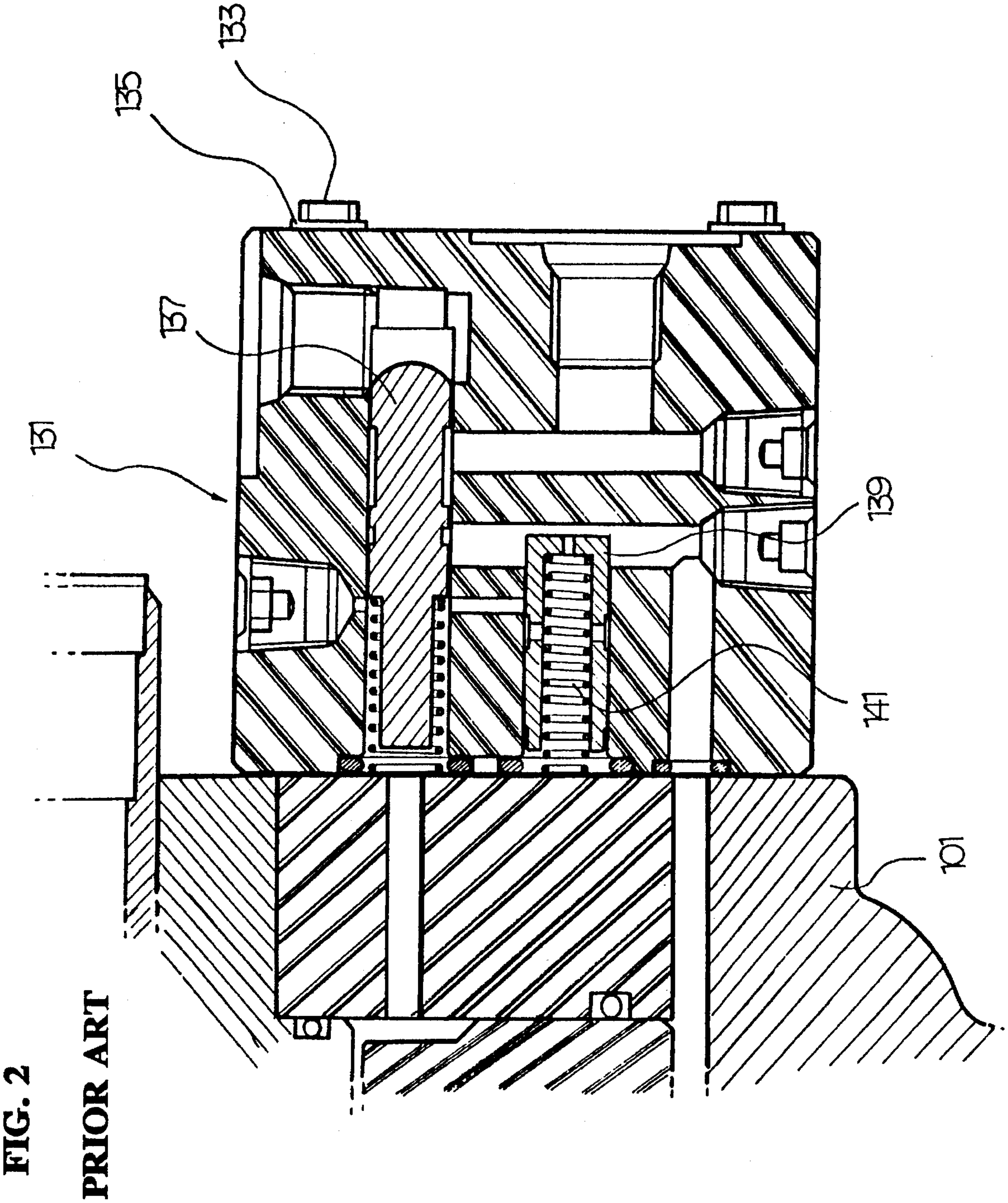
FIG. 2 PRIOR ART
FIG. 2 is a detailed section of the time delay valve shown in FIG. 1.
Figure 3:
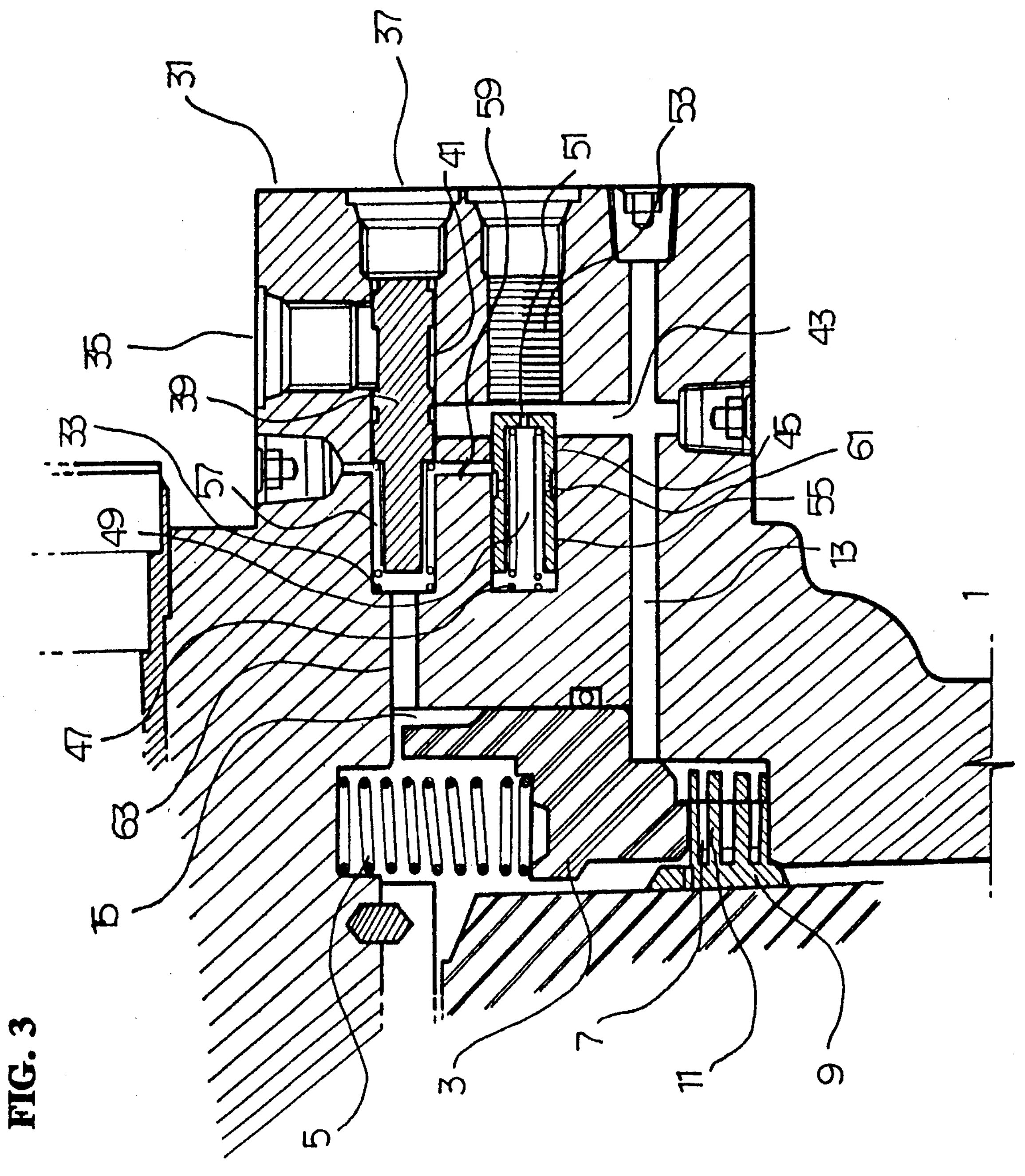
FIG. 3 is a sectional view of a time delay valve according to one embodiment of the present invention.

FIG. 3 shows a time delay valve of a hydraulic motor according to one embodiment of the present invention. In the time delay valve, a brake piston 3 is elastically supported by a spring 5 at one side of the interior of a hydraulic motor housing 1. The hydraulic motor is braked/released according as first disc plates 7 protruding from the inner wall of housing 1 are engaged with/disengaged from the second disc plates 11 protruding from the outer wall of a cylinder block 9 according to the movement of brake piston 3 by an oil pressure applied thereto.

That is, a pressure receiving chamber 13 and a pressure exhausting chamber 15 are formed at the opposite sides of brake piston 3, and the brake piston 3 moves in upward direction of FIG. 3 overcoming the elastic force of spring 5 so that the motor having been braked by brake piston 3 is released when a pressurized oil is supplied into pressure receiving chamber 13, while brake piston 3 moves in downward direction of FIG. 3 to its initial position by the elastic force of spring 5 to make first and second disc plates 7 and 11 be in close contact with each other so that the motor is braked when the pressure in pressure receiving chamber 13 and the pressure in pressure exhausting chamber 15 are balanced.

Time delay valve 31 according to the present embodiment is formed incorporated with housing 1 at one side of the interior of housing 1. A constant pressure port 35 and a signal pressure port 37, which are ports for supplying the pressurized off therethrough, are formed at time delay valve 31. A spool 39 is disposed in such a manner to be movable in a predetermined stroke according to a pressure applied to signal pressure port 37, with being supported by a spool spring 33. Constant pressure port 35 is interconnected to a main oil path or a pilot oil path so that a predetermined constant pressure is always applied thereto. In time delay valve 31 is formed an oil flowing path 43, one end of which is interconnected to pressure receiving chamber 13, and the other end of which is interconnected to a spool hole 41 of spool 39. The other end of oil flowing path 43 is interconnected to or blocked from constant pressure port 35 according to the reciprocating stroke of spool 39.

Meanwhile, an orifice spool 45 is disposed at a predetermined position in oil flowing path 43, and is elastically supported by a spring 47. Orifice spool 45 reciprocates in a predetermined stroke by a mutual action of the elastic force of spring 47 and the pressure difference between a spring chamber 49 and oil flowing path 43. At the end of orifice spool 45 is formed an orifice 51 interconnecting oil flowing path 43 and spring chamber 49 in orifice spool 45. Further, the end of orifice spool 45 is supported by a support bolt 53 inserted from the exterior of time delay valve 31.

Figure 4:
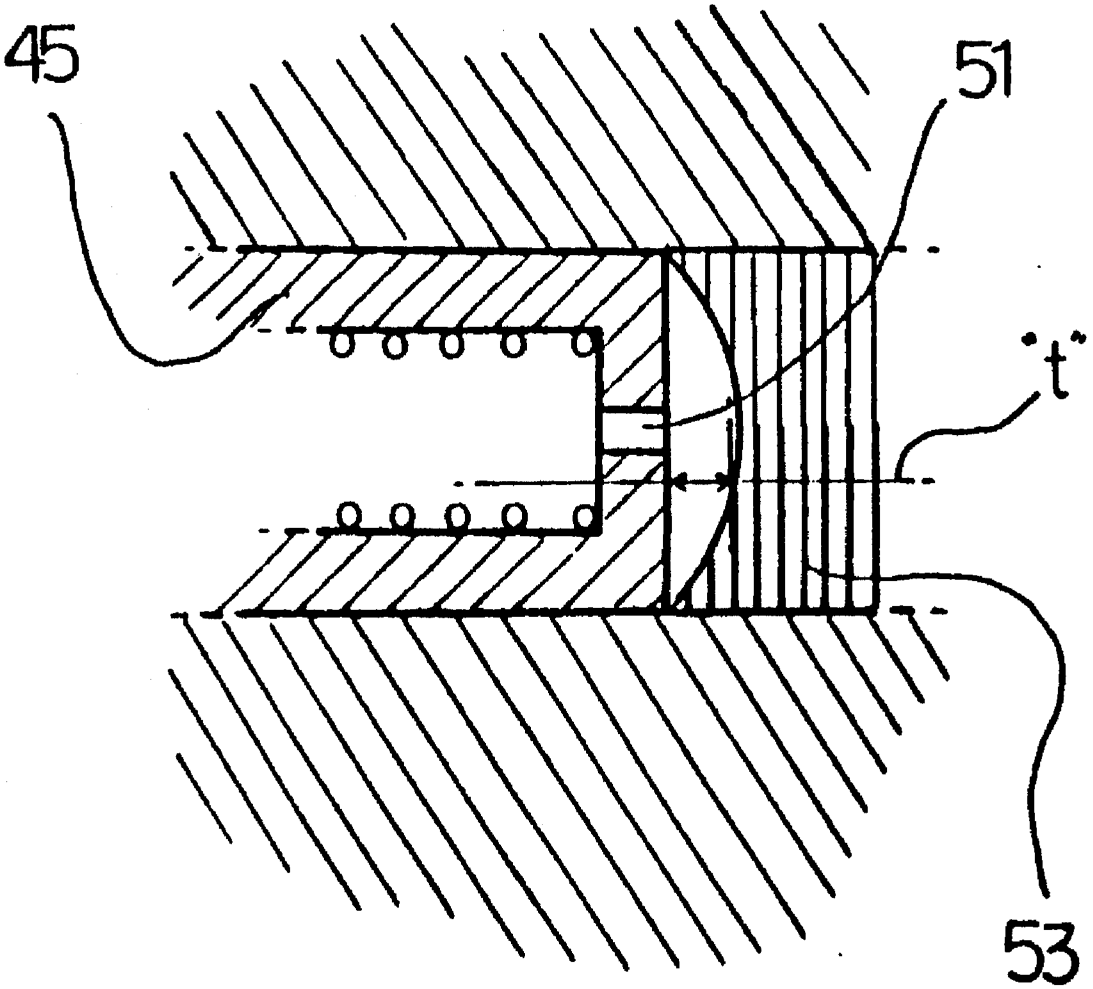
FIG. 4 is an enlarged view of part A in FIG. 3 when it is rotated at a right angle.

As shown in FIG. 4, the end of orifice spool 45 has a plain surface, and the end of support bolt 53 opposed to the end of orifice spool 45 has a curved surface with a predetermined curvature, and accordingly a predetermined gap "t" is always guaranteed between orifice spool 45 and support bolt 53. Therefore, a connecting oil path 59, one end of which is interconnected to spool hole 55 of orifice spool 45 and the other end of which is interconnected to spring chamber 57 of spool 39, is formed in the valve.

Through holes 61 are formed at predetermined positions of both sides of orifice spool 45, and the one end of connecting oil path 59 is interconnected to spring chamber 49 through through holes 61 when orifice spool 45 is at a certain position in the course of reciprocating. Further, spring chamber 57 of spool 39 is interconnected to pressure exhausting chamber 15 of brake spring 3 through oil flowing path 63.

For time delay valve 31 having above constructions, signal pressure port causes spool 39 to overcome the elastic force of spool spring 33 and move in the left direction of FIGS. by a predetermined stroke. In this event, constant pressure port 35 and oil flowing path 43 blocked up to each other are communicated with each other by the movement of spool 39, so that oil flowing in constant pressure port 35 is supplied through off flowing path 43, that is through a gap "t" between spool orifice 45 and support bolt 53 disposed within oil flowing path 43, into pressure receiving chamber 13, and by the supply of oil into chamber 13, braking piston 3 overcomes the elastic force of braking spring 5 and moves in the upward direction of FIGS., thereby the braking process is released and the hydraulic motor comes into action.

During the braking process, signal pressure being applied to signal pressure port 37 is cut off, spool 39 moves in the right direction of FIGS. and the communication between constant pressure port 35 and oil flowing path 43 is intercepted. Braking piston 3 is apt to urge and engage disc plates 7 and 11 due to its downward movement by the elastic force of braking spring 5, when oil in pressure receiving chamber 13 is compressed and opposes the left-handed movement of braking piston 3. Oil in pressure receiving chamber 13 enters into oil flowing path 43, and then flows through orifice 51 of orifice spool 45 into spring chamber 49 at the interior of orifice spool 45. At this time, orifice spool 45 is in a state of retreat on the left side of FIGS. because internal pressure of oil flowing path 43 is higher than that of spring chamber 49, but internal pressures of oil flowing path 43 and spring chamber 49 become same at a certain moment according as oil constantly flows from flowing path 43 into spring chamber 49 via orifice 51. Once both pressures are identical, orifice spool 45 moves in the left direction of FIGS. by the elastic force of spring 47 resiliently supporting orifice spool 45 and through hole 61 formed with the side of orifice spool 45 is communicated with connecting oil path 59 so that oil within spring chamber 49 flows into pressure exhausting chamber 15 through spring chamber 57 of spool 39 and off flowing path 63, thereby pressure receiving chamber 13 and pressure exhausting chamber 15 are pressure-balanced. In the meanwhile, on the moment that oil departs from spring chamber 49 within orifice spool 45, internal pressure of spring chamber 49 is lower than that of off flowing path 43 again, and thus orifice spool 45 moves in the left direction of FIGS. in turn and connecting oil path 59 is intercepted. Such processes are continually repeated until braking piston 3 moves in the left direction of FIGS. by full strokes and eventually sufficient time lag till full braking can be obtained.

Time delay valve according to the embodiment having the aforementioned construction does not require any "O-ring" for preventing leakage between engaging bolts and washers used for securing the time delay valve and engaging portions because it is formed integrally with hydraulic motor housing. Moreover, extremely simple construction of the interior of time delay valve enables the number of components and holes which must be manufactured and assembled to be reduced considerably.

Also, by means of time delay valve according to the embodiment, thickness of the casted-side wall used for maintaining strength of hydraulic motor housing is reduced such that time delay valve does not excessively protrude outwardly from the motor housing. Therefore, the restrictions on installing space of hydraulic motor and the complicity in keeping and carrying the motor due to the protrusion are eliminated.

Further, in the time delay valve according to the present embodiment, the reciprocating stroke of the orifice spool and the elastic force of the spring supporting the orifice spool can be changed by a simple handling to tighten and release the support bolt, and thereby the delay time of the time delay valve can be reset or changed very easily.

According to the present invention as described above, the number of the components of the time delay valve for a hydraulic motor is reduced, and accordingly the number of manufacturing and assembling steps of the valve is reduced. Further, the time delay valve can be easily installed, stored, and moved, because the time delay valve does not protrude out of the housing of the hydraulic motor so far. Besides, a further advantage is provided that the delay time of the time delay can be easily reset and changed.

While the present invention has been described with reference to a preferred embodiment, the description is illustrative of the invention and is not to be construed as limiting the invention. Various modifications may occur to those skilled in the art without departing from the spirit and scope of the invention as defined by the appended claims.

What is claimed is:

1. A time delay valve of a hydraulic motor, comprising:

a time delay valve body incorporated with a housing of the hydraulic motor at one side of the housing;

a first means for defining constant pressure port and a second means for defining a signal pressure port in the time delay valve body;

a spool movably disposed in the time delay valve body in such a manner to be elastically supported by a spring and be moved by a signal pressure applied to the signal pressure port;

a third means for defining a first oil flowing path, one end of which is interconnected to a pressure receiving chamber of a brake spring of a brake piston and the other end of which is interconnected to a spool hole of the spool, the constant pressure port and the pressure receiving chamber being interconnected with each other through the first oil flowing path in the course of an alternating stroke of the spool;

an orifice spool movably disposed in the first oil flowing path with being elastically supported by a spring, at one end of which an orifice opened toward the first oil flowing path is formed, and at both sides of which through holes are formed, the orifice spool being moved by the elastic force of the spring and the pressure difference between a spring chamber of the orifice spool and the first oil flowing path; and a fourth means for defining a second oil flowing path, one end of which is interconnected to the spool hole of the orifice spool and the other end of which is interconnected to a pressure exhausting chamber, the one end of the second oil flowing path is interconnected to the through holes of the orifice spool in the course of alternating stroke of the orifice spool.

2. A time delay valve of a hydraulic motor as claimed in claim 1 further comprising a fifth means for forwarding and retreating the orifice spool with opposing the elastic force of the spring which supports the orifice spool elastically, and for retaining the orifice spool in a forwarded or retreated position thereof.

3. A time delay valve of a hydraulic motor as claimed in claim 2, wherein the fifth means is a support bolt inserted and engaged in the time delay valve from the exterior thereof, one end of the support bolt inserted in the time delay valve being in contact with at least a part of a surface of the one end surface of the orifice spool.

* * * * *